(12) United States Patent
Watkins et al.

(10) Patent No.: US 7,570,201 B1
(45) Date of Patent: Aug. 4, 2009

(54) RADAR EXCITER INCLUDING PHASE COMPENSATION OF THE WAVEFORM GENERATOR

(75) Inventors: Grant H. Watkins, Dunkirk, MD (US); Stephen P. Caldwell, Columbia, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 357 days.

(21) Appl. No.: 10/981,696

(22) Filed: Nov. 5, 2004

(51) Int. Cl.
*G01S 7/40* (2006.01)
(52) U.S. Cl. .................. 342/174; 342/100; 342/173
(58) Field of Classification Search ............. 342/174
See application file for complete search history.

(56) References Cited

U.S. PATENT DOCUMENTS

| | | | | |
|---|---|---|---|---|
| 3,883,870 | A * | 5/1975 | Kunz | 342/174 |
| 4,198,604 | A * | 4/1980 | Holdaway | 455/260 |
| 4,373,160 | A * | 2/1983 | Cooper | 342/372 |
| 4,714,873 | A * | 12/1987 | McPherson et al. | 324/613 |
| 4,968,968 | A * | 11/1990 | Taylor | 342/174 |
| 5,003,314 | A * | 3/1991 | Berkowitz et al. | 342/372 |
| 5,258,724 | A * | 11/1993 | Tanis et al. | 331/1 A |
| 5,412,414 | A * | 5/1995 | Ast et al. | 342/174 |
| 5,903,611 | A * | 5/1999 | Schnabl et al. | 375/297 |
| 5,952,955 | A * | 9/1999 | Kennedy et al. | 342/25 F |
| 6,278,398 | B1 * | 8/2001 | Vossiek et al. | 342/128 |
| 6,639,950 | B1 * | 10/2003 | Lagerblom et al. | 375/297 |
| 2002/0016154 | A1 * | 2/2002 | Huttunen | 455/63 |
| 2005/0001761 | A1 * | 1/2005 | Kliewer et al. | 342/174 |
| 2006/0091950 | A1 * | 5/2006 | Hayase | 330/149 |
| 2007/0087704 | A1 * | 4/2007 | Gilberton | 455/114.3 |
| 2007/0131078 | A1 * | 6/2007 | Kokkeler | 84/1 |

* cited by examiner

*Primary Examiner*—Thomas H Tarcza
*Assistant Examiner*—Matthew M Barker
(74) *Attorney, Agent, or Firm*—Andrews Kurth, LLP

(57) ABSTRACT

Phase compensation for the phase non-linearities introduced by the filters, amplifiers, and other microwave devices included in waveform generators in a radar system is achieved by first measuring the phase errors over a predetermined frequency range which are then fed to a pair of digital random access memories (RAMs), whereupon phase predistortion commands for both the local oscillator signal used to generate the RF transmit signal and the phase non-linearity in the RF transmit signal itself are called up and applied by first applying a predistortion phase shift to the local oscillator signal when it is being generated and secondly by applying a second predistortion phase shift when the RF transmit signal is being generated.

19 Claims, 15 Drawing Sheets

RADAR EXCITER INCLUDING PHASE COMPENSATION OF THE WAVEFORM GENERATOR

BACKGROUND OF THE INVENTION

This invention relates generally to radar exciter architecture including a wide band digital waveform generator and more particularly to the compensation of the phase non-linearities introduced in the generation and transmission of the transmitted RF output signals.

DESCRIPTION OF RELATED ART

Modern radar systems, such as shown and described, for example in U.S. Pat. No. 6,081,226 entitled "Multi-Mode Radar Exciter", issued to Stephen P. Caldwell et al. on Jun. 27, 2000, include direct digital synthesis (DDS) wide band waveform generators used in generating RF output signals having highly linear FM over a bandwidth which is directly related to the DDS clock frequency. Typically, the maximum DDS frequency output is 0.4×f, where f is the DDS clock frequency. Accordingly, for a DDS clock frequency equal to 640 Mhz, the typical FM output range would be 80 Mhz to 240 Mhz, resulting in an FM bandwidth of 160 Mhz. This is shown, for example, in FIG. 1 where reference numeral 10 is broadly illustrative of the waveform generator (WFG) including a DDS signal generator 9 and clock signal generator 11, reference numeral 12 denotes the local oscillator generator for generating a first local oscillator signal $LO_1$ and reference numeral 14 broadly denotes the RF signal generator for generating the transmission signal TX.

For a given DDS clock frequency $f_s$, the normal DDS output frequency varies between $f_s/8$ and $3f_s/8$.

In order to generate the wider bandwidth required for "stretch" radar, the DDS output from a first mixer M1 shown in FIG. 1 is typically upconverted and multiplied by an integer, such as 4, by a frequency multiplier shown by reference numeral 16 in the WFG 10. A (720-880 MHz) bandpass filter Fl connected to the output of the mixer M1 passes the sum output of 720 to 880 Mhz while rejecting the 640 Mhz clock frequency and the difference output from the mixer M1. The phase non-linearities $\emptyset_1(S)$ of F1 are multiplied by 4 at the output of the waveform generator (WFG) (2880-3520 MHz) bandpass filter F2 which rejects the third and fifth harmonics of the DDS output while introducing phase non-linearities $\emptyset_2(S)$. Accordingly, the total phase non-linearities of the WFG 10 is $\emptyset_A(S)=[4\times(F1)+(F2)]=[4\times\emptyset_1(S)+\emptyset_2(S)]$.

The output of the WFG 10 is next upconverted to the radar receiver local oscillator $LO_1$ range by adding a frequency fa, typically 10,000 MHz, from a signal generator 18 to the output of filter F2 by the mixer M2 which is then coupled to the (12,880-13,520 MHz) bandpass filter F3. Filter F3 removes the fa frequency feed through and the undesired difference frequency output of mixer M2 from the desired output. However, filter F3 introduces another phase distortion $\emptyset_3(S)$ which is equal to $\emptyset_B(S)$. Hence, the receiver $LO_1$ signal at signal node 19 has a phase distortion equal to $\emptyset_A(S)+\emptyset_B(S)=[4\times\emptyset_1(S)+\emptyset_2(S)+\emptyset_3(S)]$.

In order to generate the radar transmit signal TX, a fixed signal fb from an intermediate frequency (IF) source 20, typically 2560 MHz, which is equal to the radar receiver IF frequency IF1 is added to $LO_1$ in the third mixer M3 as shown. The output of the mixer M3 is next fed to the (15,440-16,080 MHz) bandpass filter F4 which rejects the frequency fb and the undesired difference output of mixer M3. However, it introduces still another phase distortion $\emptyset_4(S)$ which is equal to $\emptyset_C(S)$. The phase distortion of the transmit output from the filter F4 on signal lead 21 is $\emptyset_A(S)+\emptyset_B(S)+\emptyset_C(S)=[4\times\emptyset_1(S)+\emptyset_2(S)+\emptyset_3(S)+\emptyset_4(S)]$. Purity of the FM phase linearity is typically measured by the level of the side lobes of the impulse response (IPR) measured at the receiver output, such as shown, for example, in the characteristic curves depicted at FIGS. 13A and B, 14A and B, 15A and B and 16A and B and which will be considered subsequently.

High phase linearity produces low amplitude side lobes. State of the art "stretch" radars require −30 dbc side lobes; however, radars now being developed require −40 dbc side lobes. According to paired echo analysis, it can be shown that −40 dbc requires a phase linearity of 10 and amplitude linearity of 0.3 db. The amplitude linearity is easier to achieve than phase linearity because amplitude limiting can be achieved in a configuration such as shown in FIG. 1.

Referring now to FIG. 2, shown thereat is the configuration of FIG. 1 as well as an embodiment of the broad concept of the subject invention. Also shown in FIG. 2 is a time delay $\Delta\tau_D$ connected between the transmitter output TX signal line 21 and the receiver input RX signal line 22. This delay simulates radar round trip delay from ground returns at different ranges and must be accounted for in evaluating total radar performance because $LO_1$ phase non-linearities, also referred to as perturbations, $[\emptyset_A(S)+\emptyset_B(S)]$ and the transmit phase perturbations $[\emptyset_A(S)+\emptyset_B(S)+\emptyset_C(S)]$ decorrelate as a function of $\Delta\tau_D$.

In order to achieve total cancellation of phase errors for all target returns and hence providing improved radar time side lobes, it has been necessary as shown in FIG. 2 to make two separate phase compensations, one on the receiver $LO_1$ signal and the other on the transmitter signal TX.

In FIG. 1, bandpass filter F1 is a very difficult filter to implement because it must reject the difference frequency output of mixer M1 and a feed through from the fixed 640 Mhz clock signal, and also it must be very phase linear since such phase non-linearities are multiplied by 4 in the multiplier 16. If the bandwidth of filter F1 is 160 Mhz, a filter shape factor YL=(800−640)/160=1.0, the minimum acceptable value for a practical filter which can provide the rejection needed at 640 Mhz. With a shape factor of 1.0, the filter must be phase linear over its entire bandwidth.

Steep filter skirts and good phase linearity over the entire bandwidth of a bandpass filter are extremely difficult to achieve. Furthermore, such performance is particularly hard to achieve for filters which must function with a high degree of voltage standing wave ratio (VSWR) mismatch, as with a filter driven by a mixer. As a general rule, it has been found heretofore that to achieve good phase linearity in a waveform generator, Butterworth or 0.01 db Chebychev filters are required with at least 50% extra bandwidth. Phase linear filters such as Gaussian or Bessel filters must be very well matched with regard to VSWR to achieve good phase linearity; however, their amplitude response is not flat but bell-shaped. Such properties result in waveform generator impulse responses (IPR's) worse than waveform generators using Butterworth or 0.01 dB Chebychev filters, whose filter skirts are not steep.

Thus for the filter F1 shown in FIG. 1, if the bandwidth were to be increased 50% from 160 Mhz to 240 Mhz, the resulting shape factor would be YL=800−640)/240=0.66. This becomes an impossible filter to implement if it must also be phase linear.

From the foregoing, it is evident that some form of phase compensation is required in the waveform generator (WFG) to meet the extreme phase linearity requirements now being imposed on radar systems now being developed.

SUMMARY

Accordingly, it is an object of the present invention to provide an improvement in radar technology.

It is another object of the invention to provide improvement in waveform generators used in connection with modern day radar systems.

And it is yet a further object of the invention to compensate for total phase non-linearities introduced by the filters, amplifiers, and other microwave devices included in waveform generators of radar systems for the generation of RF signals.

And it is yet still another object of the invention to provide an improvement in radar signal resolution with signal filters which are currently realizable.

The foregoing and other objects are achieved by phase compensating both the local oscillator signal $LO_1$ used to generate the RF transmit signal and the phase non-linearity in the transmit signal TX itself by sensing and summing the phase non-linearities generated in the filters of the waveform generator by first applying a predistortion phase shift to generate the local oscillator signal when it is being generated and secondly by applying a second predistortion phase shift when generating the RF transmit signal.

Phase compensation is achieved by measuring the phase errors over a predetermined frequency range which are then fed to a pair of digital random access memories (RAMs), whereupon phase predistortion commands are called up at the same time as frequency and phase commands are generated. It is important to note that the phase predistortion implementation is open loop and does not use a feedback loop where loop delay can cause stability problems.

Further scope of applicability of the present invention will become apparent from the detailed description provided hereinafter. It should be understood, however, that the detailed description and specific examples, indicating the preferred embodiments of the invention, are provided by way of illustration only, since various changes and modifications coming within the spirit and scope of the invention will be apparent to those skilled in the art from the detailed description.

BRIEF DESCRIPTION OF THE DRAWINGS

The present invention will become more fully understood from the detailed description provided hereinafter when considered in conjunction with the accompanying drawings, which are provided by way of illustration only, and thus are not meant in any way to be limitative of the present invention, and wherein.

DETAILED DESCRIPTION OF THE INVENTION

Figure 1:
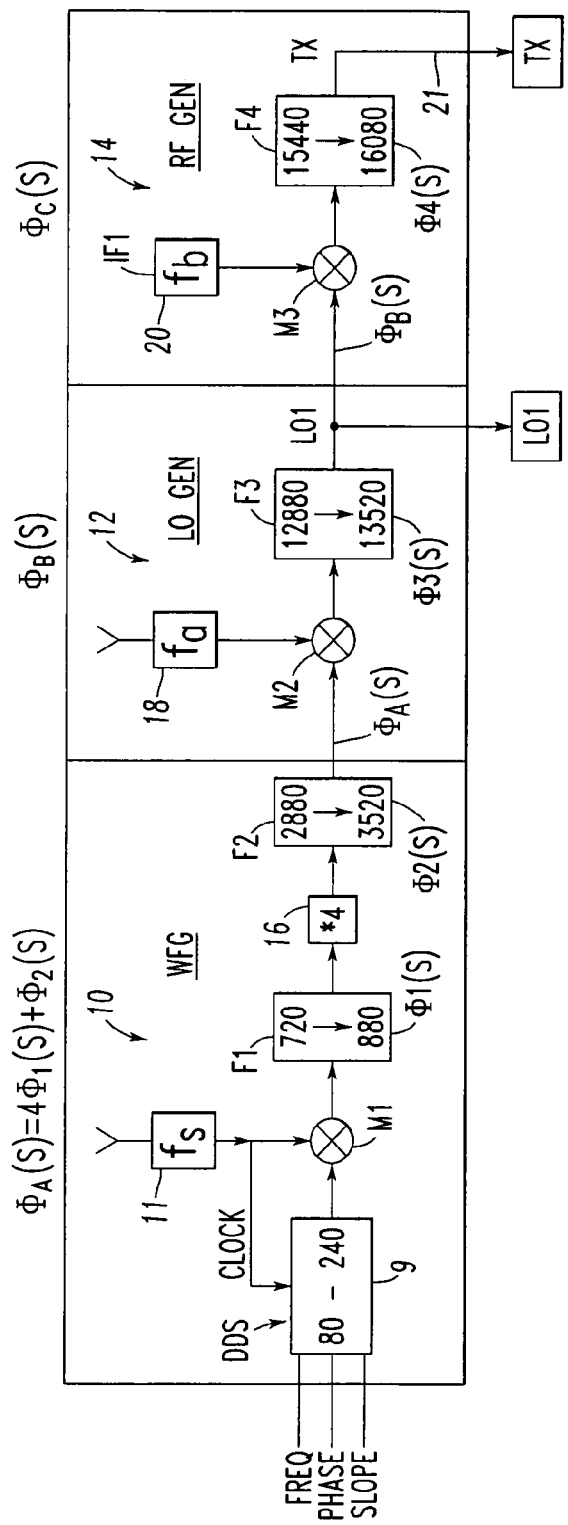
FIG. 1 is a block diagram illustrative of radar waveform generator in accordance with the known prior art.
Figure 2:
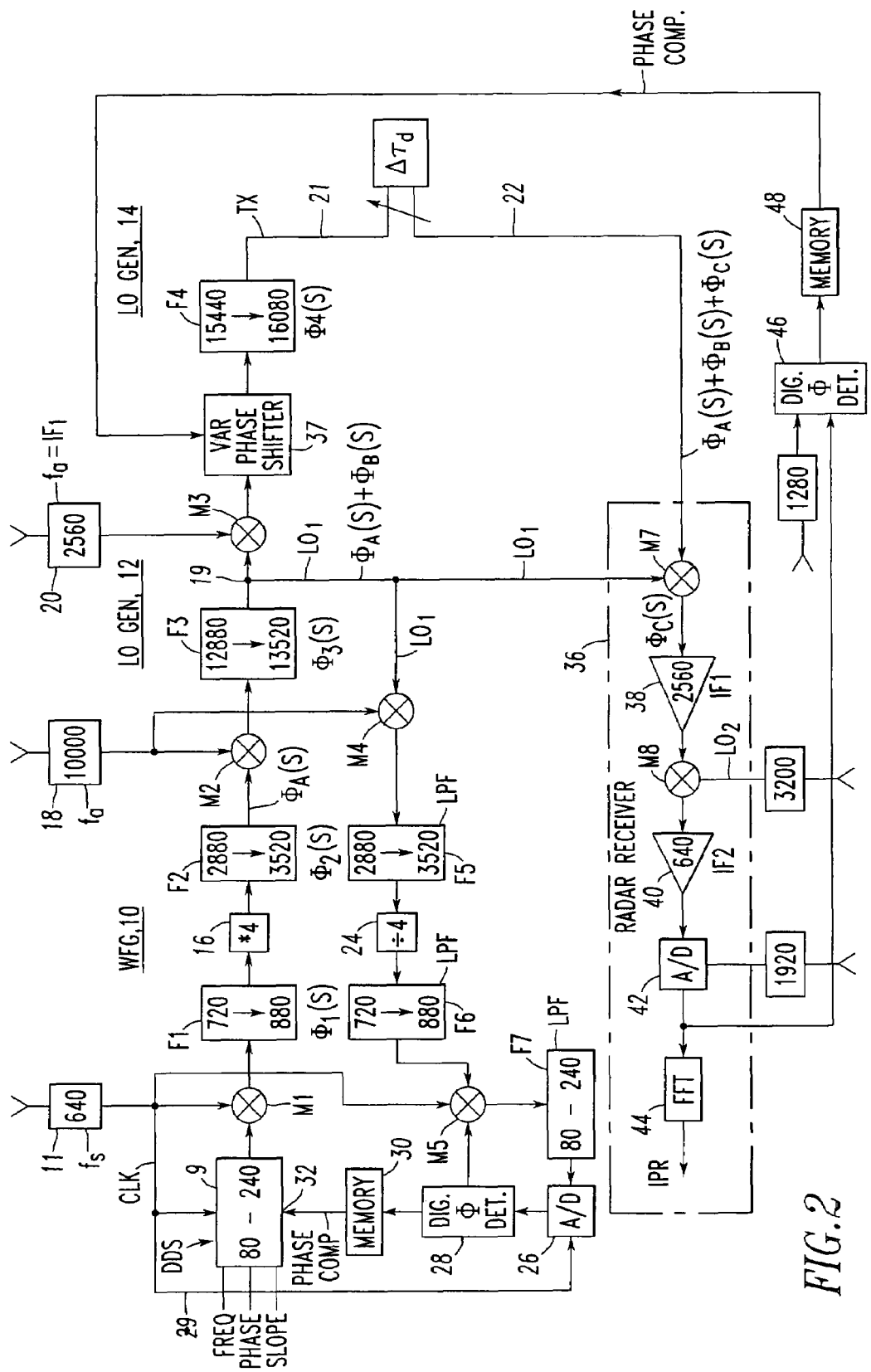
FIG. 2 is a block diagram broadly illustrative of the subject invention.

Referring now to the drawings wherein like reference numerals refer to like circuit elements throughout, and having discussed the prior art in FIG. 1 and FIG. 2 as it relates to including the elements of FIG. 1, FIG. 2 also discloses the broad concept of the subject invention where separate phase compensations are provided for both the receiver $LO_1$ signal and the transmitter signal TX.

Referring again to FIG. 2, phase compensation in the waveform generator (WFG) 10 is achieved by down converting the $LO_1$ signal. This is achieved by feeding $LO_1$ at circuit node 19 including the phase perturbations $\emptyset_A(S)+\emptyset_B(S)$ to a signal mixer M4 which also receives frequency fa. The difference signal is applied to a (228-3520 MHz) lowpass filter F5 which is then divided in frequency by a factor of 4 in a frequency divider 24. The output of the frequency divider 24 is next fed to a (720-880 MHz) lowpass filter F6, where it is then fed to another mixer M5 along with a 640 MHz fs signal via signal lead 27. The difference signal is fed to an (80-240 MHz) lowpass filter F7, with the output thereof being fed to an analog to digital converter 26 which also receives the 640 MHz clock signal from the source 11 via signal lead 29. The digital output signal from the A/D converter 26 is next applied to a digital phase detector 28, which provides a comparison of the phase of the (80-240 MHz) DDS output frequency applied to mixer M1 to the phase of the phase distorted local oscillator signal $LO_1$ at circuit node 19. An error voltage from the phase detector 28 is required to be proportional to the total $LO_1$ phase error of $\emptyset_A(S)+\emptyset_B(S)=[4\emptyset_1(S)+\emptyset_2(S)+\emptyset_3(S)]$. The actual phase error voltage is proportional to $[\emptyset_1(S)+\{\emptyset_2(S)+\emptyset_3(S)\}/4]$. The proportionality constant of 4 can be accounted for with voltage gain as will be shown.

Figure 5:
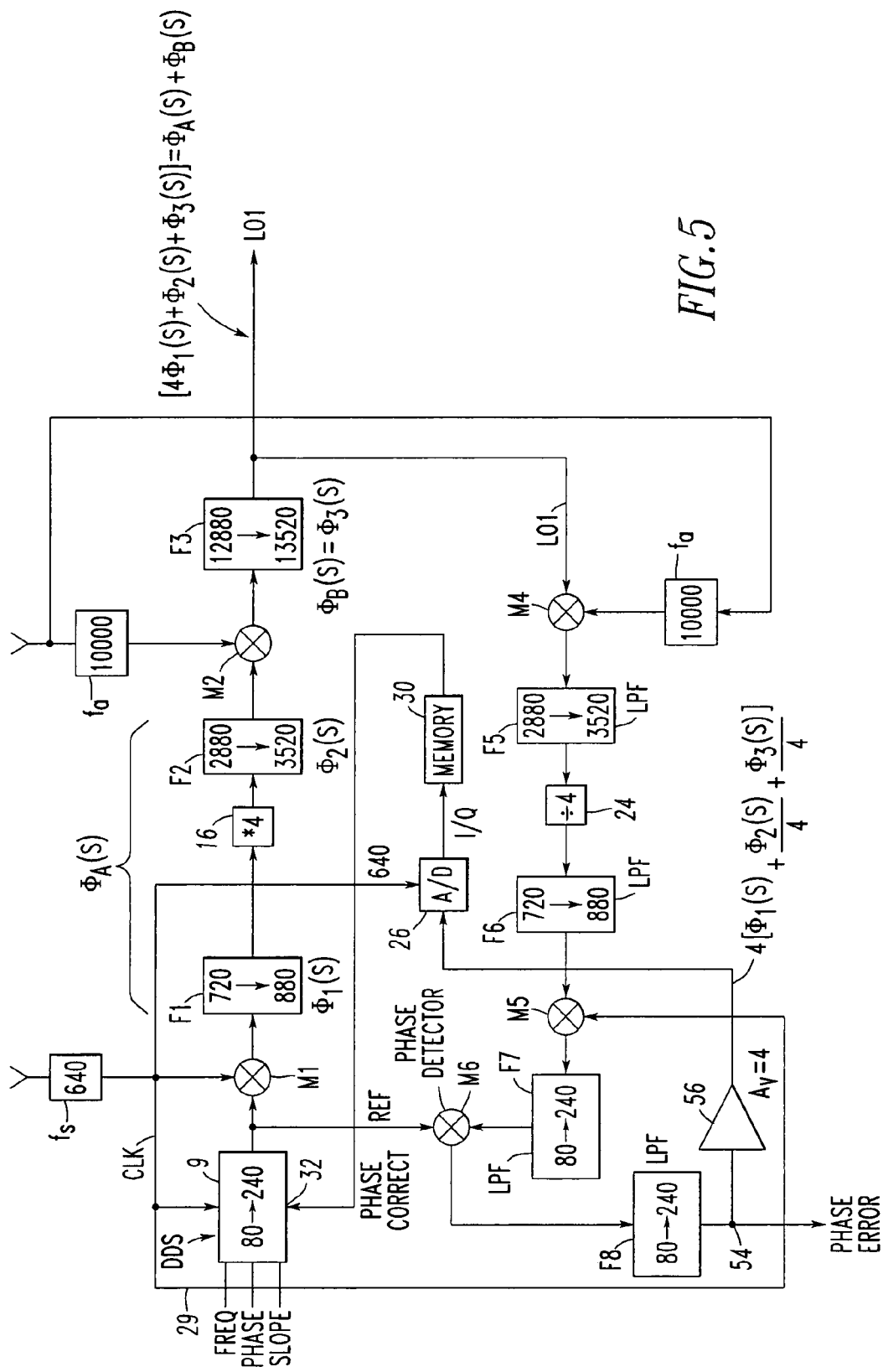
FIG. 5 is illustrative of an embodiment of the subject invention showing phase detection with conventional phase detector at video for providing phase compensation.

An equivalent and a relatively easier way of illustrating the basic concepts of FIG. 2 is shown in FIG. 5 where phase compensation is done at video and the phase error is detected by a conventional phase detector M6. The error voltage from the phase detector M6 is also required to be proportional to the total LO$_1$ phase error of $\varnothing_A(S)+\varnothing_B(S)=[4\varnothing_1(S)+\varnothing_2(S)+\varnothing_3(S)]$. Again, the actual phase error voltage is proportional to $[\varnothing_1(S)+\{\varnothing_2(S)+\varnothing_3(S)\}/4]$. The proportionality constant of 4 is now provided for by the voltage gain of operational amplifier 31.

Returning now to FIG. 2, the output of the digital phase detector 28 is applied to a memory, e.g., a random access digital memory (RAM) 30. The DDS 9 shown in FIG. 2 now also includes an input command port 32 where phase compensations comprising predistortion values are applied from memory 30 concurrently with frequency and phase commands that are applied to the DDS 9 from a master controller, not shown.

Phase compensation values are generated by running the DDS 9 on a CW basis starting at the center of the tuning range. The frequency is stepped in small increments below the DDS center frequency and predistortion measurements are sequentially made and a unique predistortion digital code is stored in the memory 30 for each frequency. The process is repeated as the DDS frequency is increased above the DDS center frequency. The number of phase predistortions are capable of compensating multiple values of n radians, since the phase non-linearities in the total chain from the DDS to the output of filter F3 at circuit node 19 can be multiples of Π radians of phase. This requirement results in having enough frequency points in memory to resolve multiples of Π.

Figure 3:
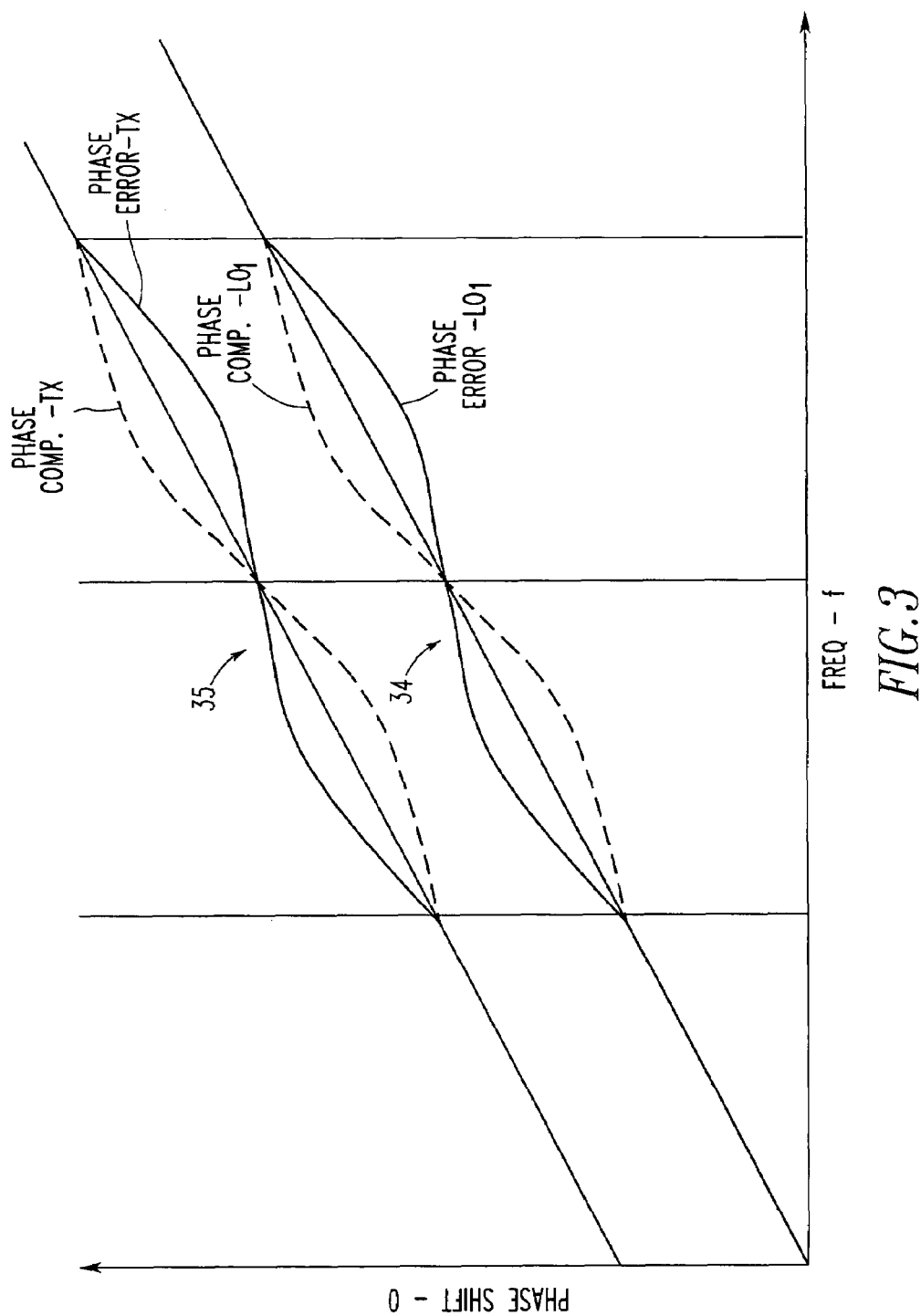
FIG. 3 is a set of phase shift vs. frequency curves illustrating the phase compensation provided by the subject invention.

It is not necessary to phase compensate or delay (phase shape) to an absolute value of phase. It is just necessary to compensate for phase variations from the desired linear phase vs. frequency response as shown in FIG. 3. Reference numeral 34 of FIG. 3 is illustrative of a single cycle of phase distortion across the sweep as the DDS sweeps from 80 MHz to 240 MHz in the generation of LO$_1$, while reference numeral 35 shows a single cycle of phase distortion of the RF output transmit signal TX.

For a given level of time sidelobes for the impulse response of the entire radar system as shown in FIG. 2, both the amplitude of the phase ripple and the number of cycles of ripple across the sweep determine the impulse response IPR. A single cycle of phase ripple with a given value of peak-to-peak phase deviation across the sweep will produce much better-lower-time sidelobes than will phase ripple of several cycles. Such has been verified by numerous computer simulations and radar hardware measurements. Furthermore, these measurements reveal that phase and amplitude ripple are dominated by a low number of cycles, typically 1-3 cycles. See, for example, FIGS. 13, 14, 15 and 16.

As noted earlier the phase pre-distortion is implemented in an open loop circuit configuration. The total time delay around the loop shown in FIG. 2 is unimportant since the technique does not use a feedback loop in which loop delay can cause stability problems. Rather, the predistortion commands are called up at the same time as the original frequency and phase commands are called up.

Figure 4A:
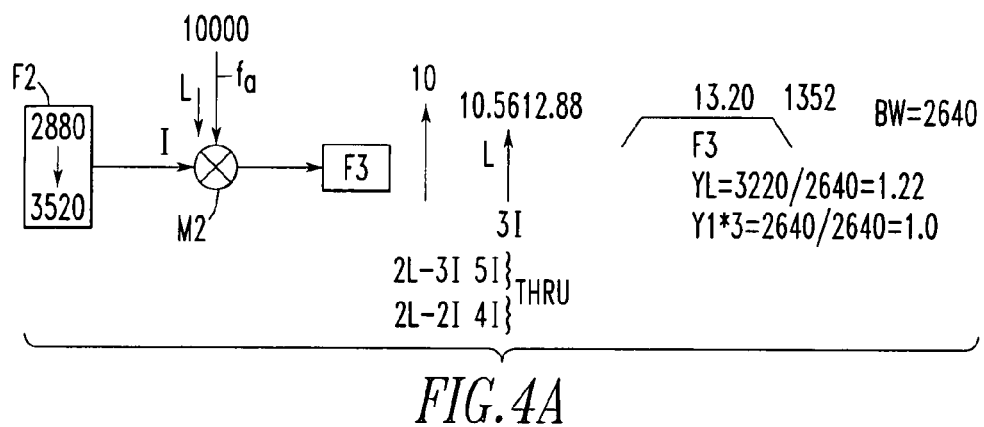
FIGS. 4A and 4B depict bandpass and lowpass filter portions of the embodiment shown in FIG. 2.
Figure 4B:
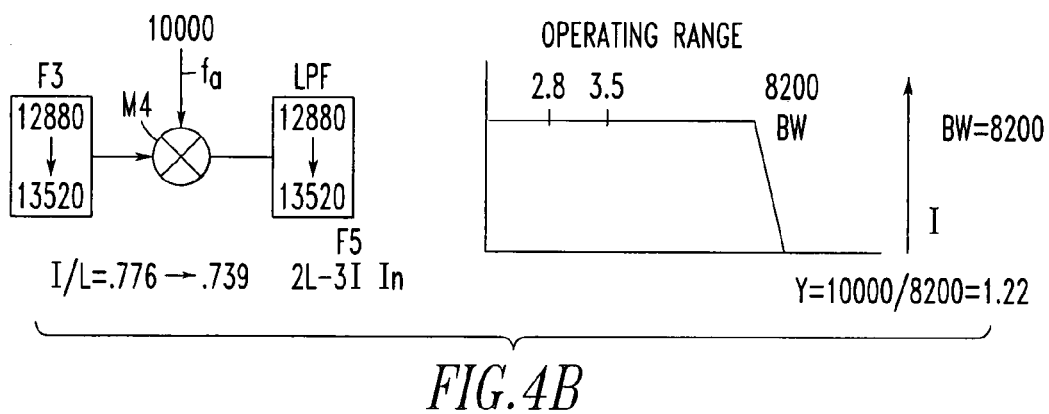

It is significant to note that the filters F5, F6 and F7 in the down conversion portion of FIG. 2 are comprised of simple very wide band lowpass filters as opposed to the bandwidth of bandpass filters F1, F2 and F3. As such, they can be made very phase linear and they can be made to operate in low spur regions of the mixer charts and are operated over a very small portion of their total bandwidth. FIGS. 4A and 4B are illustrative of this feature.

FIG. 2 also discloses the concept of providing phase compensation in the radar transmit output signal TX. The transmit output signal TX is generated by summing the local oscillator signal LO1 at signal node 19 with a fixed frequency of 2560 MHz which comprises a signal fb which is equal to the received first IF signal IF1. The phase non-linearities in the transmit chain are characterized by $\varnothing_C(S)$.

In FIG. 2, reference numeral 36 denotes the radar receiver portion of a radar system. As shown, the transmit phase non-linearities $\varnothing_C(S)$ can be measured by the actual radar receiver if $\Delta\Gamma_d=0$. In this configuration, it is not necessary to first remove the $\varnothing_A(S)+\varnothing_B(S)$ non-linearities as long as $\Delta\Gamma_d$ is zeroed out so that there is no decorrelation of $\varnothing_A(S)+\varnothing_B(S)$. Such terms cancel out in radar receiver mixer M4.

Figure 8:
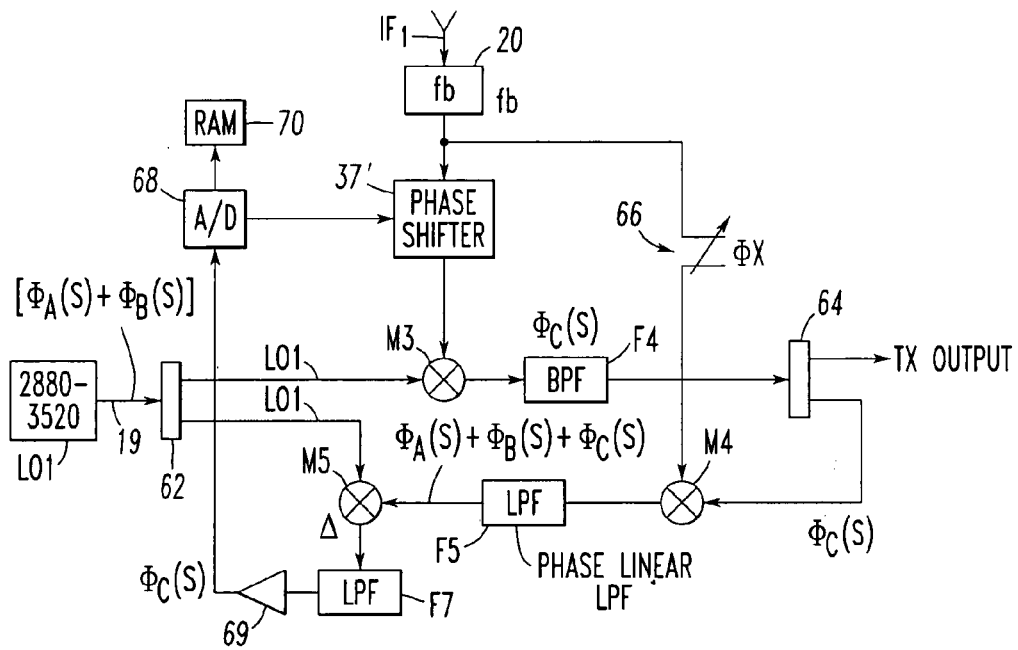
FIG. 8 is illustrative of an embodiment for compensating the transmit signal TX in the IF circuitry.

In the configuration shown in FIG. 2, the transmit phase non-linearity $\varnothing_C(S)$ is compensated for by applying a predistortion phase shift in series with the output of the mixer M3 via a variable phase shifter 37. It can also be applied in series with the signal source 20, while the transmit waveform is generated as shown in FIG. 8.

With respect to the scheme shown in FIG. 2, the LO$_1$ oscillator signal having the phase non-linearities $\varnothing_A(S)+\varnothing_B(S)$ and the TX signal on circuit lead 22 having the phase non-linearities $\varnothing_A(S)+\varnothing_B(S)$, $\varnothing_C(S)$ are applied to the mixer M7 in the radar receiver 36 which outputs a difference signal having phase non-linearity $\varnothing_C(S)$ having a frequency of 2560 MHz and which is applied to an IF amplifier 38. The output of amplifier 38 is fed to a second mixer M8 along with a second local oscillator signal LO$_2$ of 3200 MHz. The mixer M8 outputs a difference signal of 640 MHz which is applied to a second IF amplifier 40. The output of the IF amplifier 40 is fed to an analog to digital (A/D) converter 42 which is clocked by a 1920 MHz clock signal. The output of the A/D converter 42 is applied to a Fast Fourier Transform (FFT) unit 44 which outputs an impulse response signal. The output of the A/D converter 42 is also fed to a digital phase detector 46 along with a 1280 clock signal which outputs a phase non-linearity measurement signal to a second random access memory (RAM) 48. The memory 48 is programmed with phase non-linearities in the same manner in the waveform generator portion of the system. Phase compensations in the form of predistortion phase shifts are applied to the variable phase shifter 37 between the mixer M3 and the (15440-16080 MHz) bandpass filter F4 to compensate for the phase non-linearity $\varnothing_A(S)=\varnothing_C(S)$. Because the frequency coming through the receiver IF$_1$ amplifier 38 and IF$_2$ amplifier 40 is constant, there is no need for a special wide bandwidth.

Figure 6:
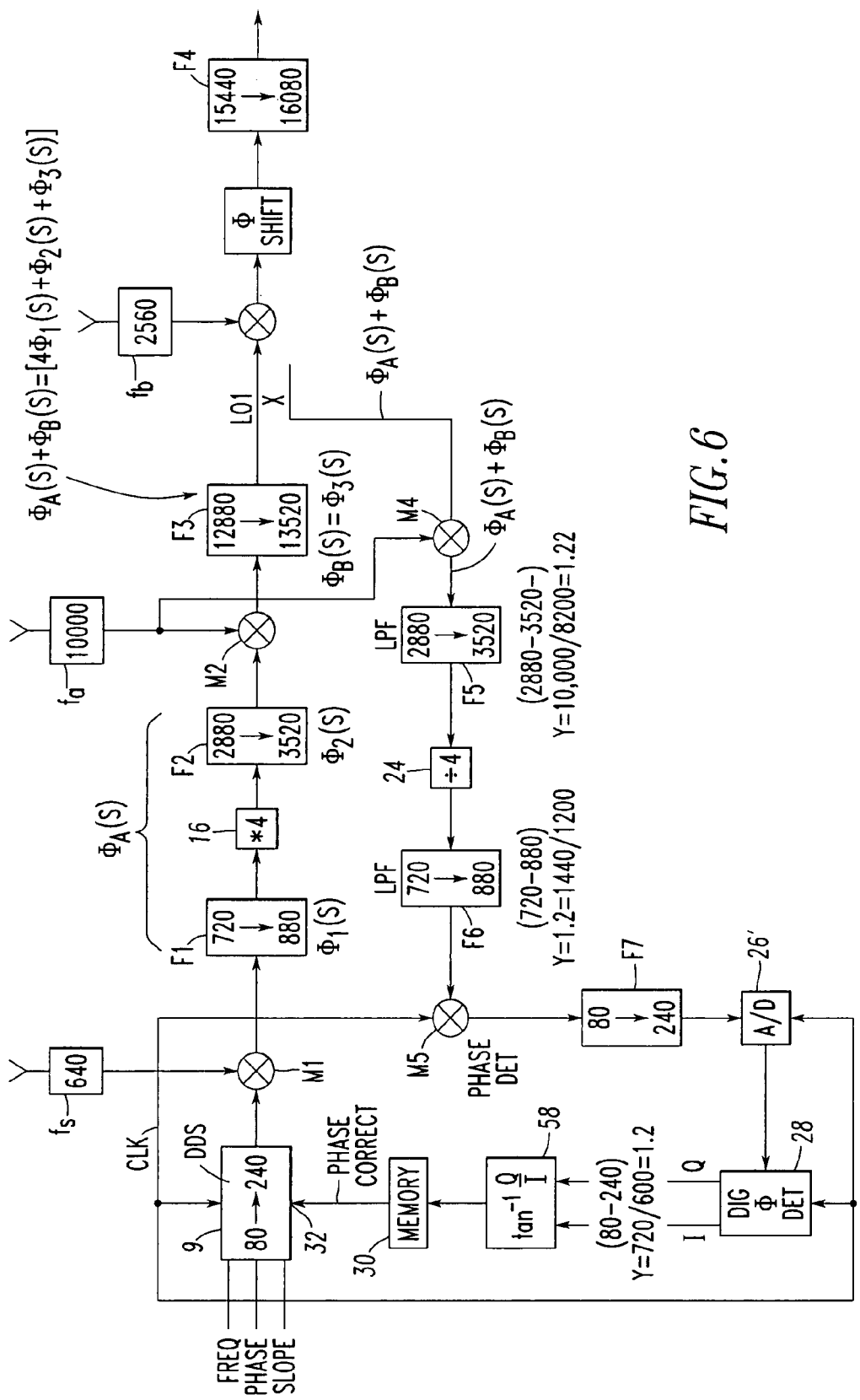
FIG. 6 is illustrative of an embodiment of the subject invention showing phase detection with IF sampling.

Referring now to FIGS. 5 and 6, they respectively disclose analog and digital phase detector embodiments for providing phase compensation of the waveform generator 10 in FIG. 2.

In FIG. 5, the phase detector 50 is implemented by the mixer M6 which receives as inputs the output frequency signal from the DDS 9 at circuit node 52 and the output of the (80-240 MHz) lowpass filter F7 connected to the output of the mixer M5. The difference output of mixer M6 is at DC and is fed to lowpass filter F8 which provides the phase error at circuit node 54. The phase error signal at node 54 which is proportional to $[\varnothing_1(S)+\{\varnothing_2(S)+\varnothing_3(S)\}/4]$ is fed to an operational amplifier 56 having a gain of 4, where it is then fed to the analog to digital converter 26 which is coupled to the memory 30 so as to store a set of phase corrections as described above.

With respect to FIG. 6, a difference output from the mixer M5 is fed to (80-240 MHz) lowpass filter F7 which is connected to an analog to digital converter 26'. The digital phase detector 28 is now shown providing in-phase (I) and quadrature (Q) outputs which are fed to tan$^{-1}$ Q/I circuitry 58. FIG. 6 depicts an embodiment wherein the total LO$_1$ phase error of $4\varnothing_1(S)+\varnothing_2(S)+\varnothing_3(S)$ is not detected with a conventional phase detector as shown in FIG. 5, but is detected with IF sampling. The phase detector implemented by mixer M6 in FIG. 5 is now eliminated. This approach, however, requires a high speed A/D converter 26' which is clocked at a frequency greater than twice the maximum IF frequency and greater than twice the IF bandwidth.

The embodiment shown in FIG. 6 also requires that the mixer M5 be an IQ mixer if the I/Q detection is not done digitally after the A/D converter 26' by the digital phase detector 28. It is also required that all frequencies are derived from a single master oscillator, i.e., the 640 MHz fs clock signal, so that they are not only harmonically related, but also locked in phase. In such instance, if M5 is a I/Q mixer, the Q output of M5 is proportional to A sin (F6−640+phase $\varnothing_1(S)$+$\varnothing_2(S)/4$+$\varnothing_3(S)/4$=A sin θ and the I output of M5 is proportional to A cos θ, where θ=1 tan$^{-1}$ (Q/I). Also the output of M5 is proportional to $I^2+Q^2=R^2=A^2$ ($\sin^2 θ+\cos^2 θ$)=$A^2$.

Figure 7:
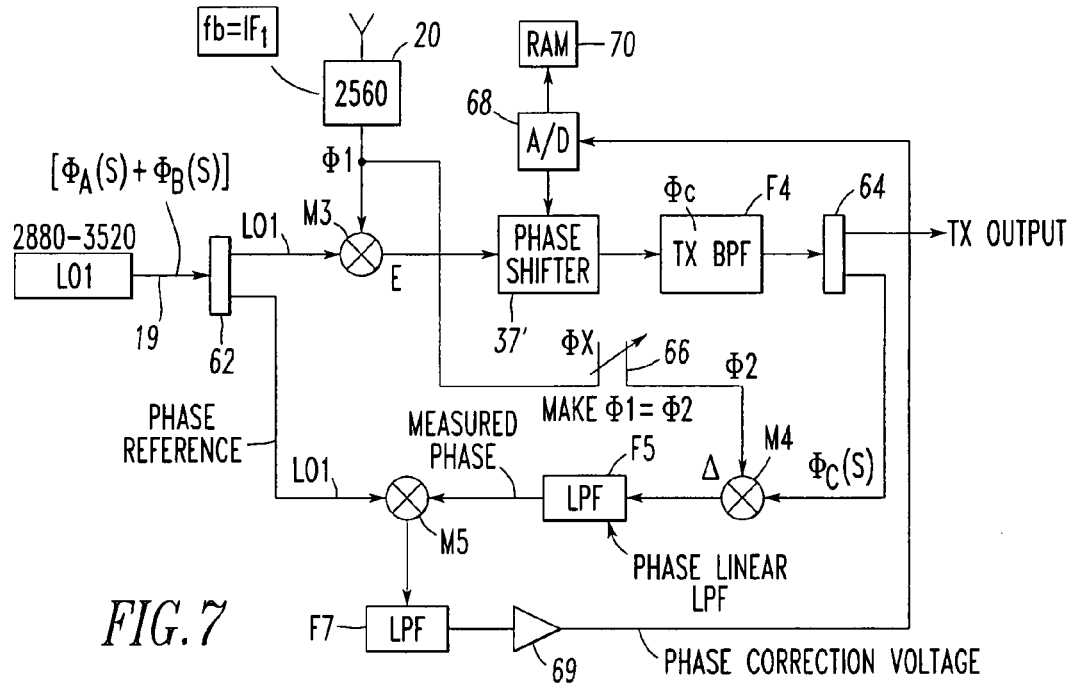
FIG. 7 is illustrative of an embodiment of the subject invention for compensating of the transmit signal TX with a phase shifter in the transmit output circuitry.

Referring now to FIGS. 7 and 8, shown thereat are embodiments which disclose how the transmit TX phase non-linearities $\varnothing_C(S)$ can be compensated for without the radar receiver. In these configurations, phase shifter $\varnothing_X$ shown by reference numeral 66 equalizes the group delay to both ports of mixer M4 so the term [$\varnothing_A(S)+\varnothing_B(S)$] cancels out in the phase detector.

In FIG. 7, compensation of phase non-linearities of $\varnothing_C(S)$ is applied in series with the transmit output. As shown, the local oscillator signal $LO_1$ at node 19 and including phase non-linearities $\varnothing_A(S)+\varnothing_B(S)$ are applied to a signal splitter 62 where one portion of a signal is fed to the mixer M3 and the other portion is fed as a phase reference to the mixer M5. The 2560 MHz $IF_1$ is fed to the other input of mixer M3 and the difference signal output is fed to a variable phase shifter 37' which comprises a broadband phase shifter. The output of the phase shifter 37' is fed to bandpass filter F4 in the same manner as FIG. 2 and where the output comprises the TX output; however, in this embodiment, the TX output is fed to a signal splitter 64 wherein a portion of the output signal TX having phase non-linearities of $\varnothing_C(S)$ is fed to mixer M4, whose other input is connected to the $IF_1$ signal through a $\varnothing_X$ phase shifter 66. The difference output from the mixer M4 is fed to a phase linear lowpass filter F5, the output of which comprises a measured phase signal which is applied to the other input of mixer M5. The difference output is fed to a lowpass filter F7 where it is coupled to the analog to digital converter 68 via operational amplifier 69, and then to the memory 70 which again is loaded with discrete values of phase compensation which are used to apply predistortion or commands to the phase shifter 37' for compensating for the $\varnothing_C(S)$ occurring in the filter F4 in the TX output circuitry.

With respect to FIG. 8, it depicts an embodiment where compensation of the transmit signal TX is achieved by applying phase compensation in series with the 2560 MHz signal $IF_1$ source 20 where the phase shifter 37' is now connected to one input of the mixer M3. The difference output from the mixer M5 and applied to the lowpass filter F7 is now fed back to the A/D converter 68 through amplifier 69 which provides a phase correction voltage of $KØ \times \varnothing_C(S)$ where KO is equal to the phase detector sensitivity (volts/radians). In both instances of the configuration shown in FIGS. 7 and 8, the mixer M5 acts as a phase detector in the same manner that M6 acts as a phase detector in FIG. 5. In the configuration shown in FIGS. 7 and 8, connecting cables are much shorter and the $\varnothing_X$ phase shifter 66 equalizes group delay to both ports of the mixer M4 so that the term [$\varnothing_A(S)+\varnothing_B(S)$] cancels out in the mixer M4.

Figure 9:
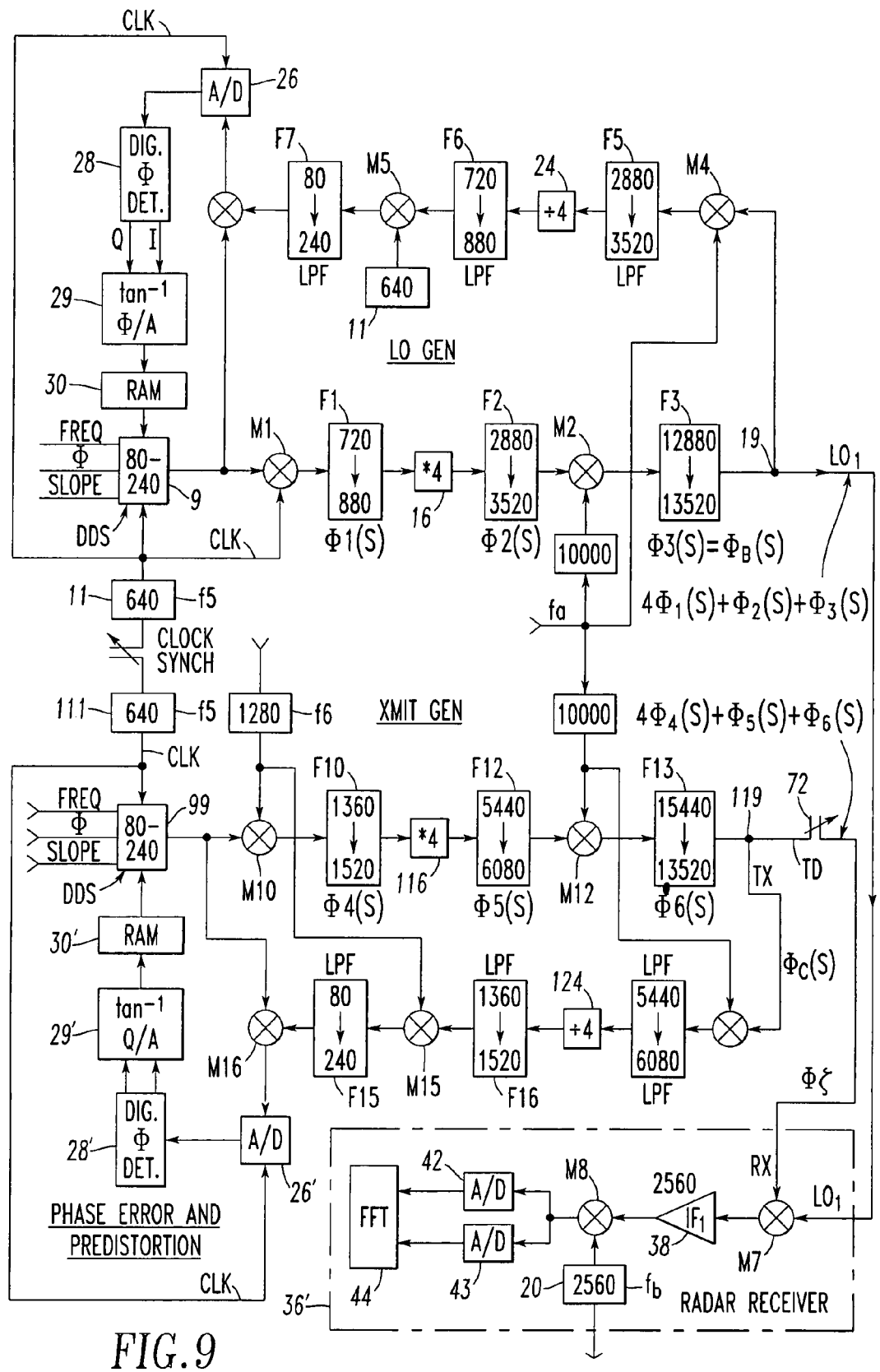
FIG. 9 is illustrative of an embodiment of the subject invention including two direct digital synthesis (DDS) signal generators and for compensating for both the phase non-linearities of the transmit signal TX as well as the local oscillator signal $LO_1$ with IF sampling.

FIG. 9 discloses the concept of how the local oscillator $LO_1$ and transmit TX phase non-linearities can be removed independently of each other utilizing two DDS circuits 9 and 99 and the accompanying circuitry which are substantially identical with the exception that the filters F10, F12 ... F17 have different bandwidths. In this configuration, both 640 MHz DDS clocks 11 and 111 must be precisely aligned, particularly for radar applications. For example, whereas filter F1 has a bandwidth of 720-880 MHz and generates a phase non-linearity $\varnothing_1(S)$, the filter F10 has a bandwidth of 1360-1520 MHz and providing a phase non-linearity of $\varnothing_4(S)$. Also, lowpass filter 15 has a bandwidth of 5440-6080 MHz, lowpass filter F16 has a bandpass of 1360-1520 MHz, and lowpass filter F17 has a bandpass of 880-240 MHz. This is because mixer M15 has a frequency input of 1280 MHz. Accordingly, the $LO_1$ output of filter F3 at circuit node 19 is [$4\varnothing_1(S)+\varnothing_2(S)+\varnothing_3(S)$]. In a like manner, the output of filter F13 at circuit node 19 is [$4\varnothing_4(S)+\varnothing_5(S)+\varnothing_6(S)$]. Predistortion phase values are generated and stored in the same manner as shown and described with respect to FIG. 6.

A phase shift from phase shifter 72 is applied to the TX signal output from the filter F13 to simulate a receive signal RX which is applied to the mixer M7 in the radar receiver circuitry 36' which includes the same IF amplifier 38 shown in FIG. 2 whose output is fed to mixer M8 along with $IF_1$ frequency of 2560 MHz from the source 20. Mixer M8 now outputs both I and Q signals which are A/D converted in converters 42 and 43 where they are fed to the FFT unit 44 as before.

With respect to the embodiments shown in FIGS. 7, 8 and 9, phase predistortion routine is also carried out open loop at the same time DDS frequency and phase commands change. Again, there are no potential loop stability problems which can occur with closed loop feedback systems. In order to check the total phase compensation for both transmit TX and $LO_1$, the receiver FFT process carried out in the FFT 44 can be fully utilized to generate impulse responses so that the actual time sidelobes of a synthetic aperture radar compressed pulse can be evaluated.

One advantage of a mechanization such as shown in FIG. 9 is that the phase compensation and error measurement for $LO_1$ and TX can be performed with a separate DDS that has independent digital command inputs for phase predistortion. This eliminates the need for expensive delay lines needed for exciters that only use one waveform generator. Another advantage of using the separate waveform generator for transmit TX and LO waveform generator output is that the $LO_1$ WFG operates at a fixed frequency while the transmit waveform generator is swept and thus permits the calibration of wideband chirps.

Stepped chirps could also be calibrated using two WFGs. Since the radar receiver 36' shown in FIG. 9 includes an FFT processor 44, this can also be used to evaluate the level of time sidelobes of a SAR impulse response and to fine tune the phase of the radar receiver across the bandwidth of $IF_1$.

While the configuration shown in FIG. 9 uses separate DDSs and upconverters to generate transmit TX and $L0_1$ excitation, there is yet another way of phase calibrating both the TX and $LO_1$ exciters if a special purpose receiver is used. This can ultimately be simpler than that shown in FIG. 9. Such an embodiment is shown in FIG. 10.

Figure 10:
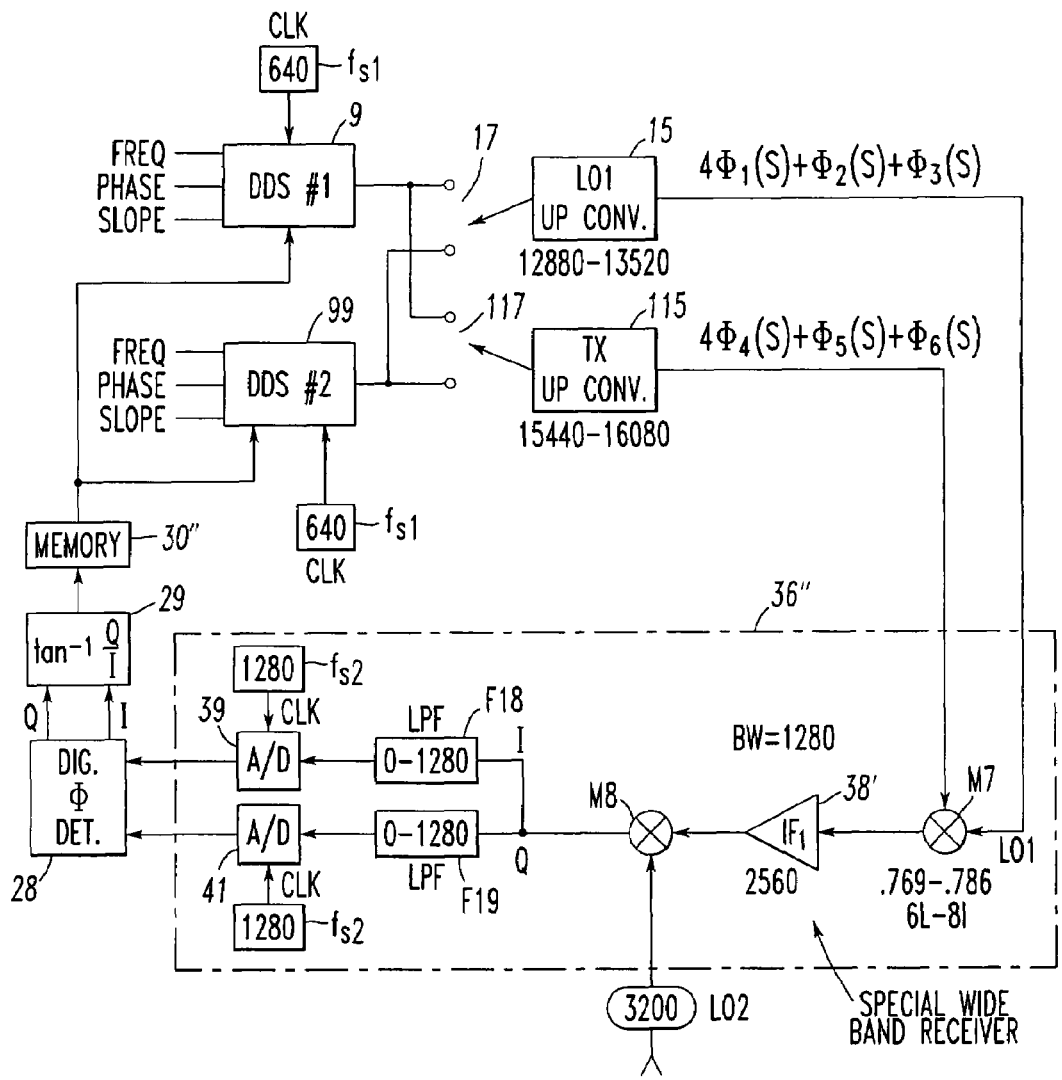
FIG. 10 is illustrative of an embodiment for providing phase compensation with IF sampling over a moderate bandwidth.

Referring now to FIG. 10, it depicts DDS #1 shown by reference numeral 9 and DDS #2 shown by reference numeral 99 being adapted to drive either the $LO_1$ up-converter 15 or the TX up-converter 115. The $LO_1$ of converter 15 generates phase perturbations [$4\varnothing_1(S)+\varnothing_2(S)+\varnothing_3(S)$] whereas up-converter 115 produces phase perturbations of [$4\varnothing_4(S)+\varnothing_5(S)+\varnothing_6(S)$]. Both up-converters 15 and 115 are adapted to sweep over the same frequency range by virtue of a pair of cross-coupling switches 17 and 117. The receiver 36" now includes a wide band IF amplifier 38' which has an $IF_1$ bandwidth (1280 MHz) that is at least the RF bandwidth to be swept and has an $IF_1$ which is phase linear.

The output of the IF amplifier 38' is fed to mixer M8 along with an $LO_2$ local oscillator signal of 3200 MHz. The mixer outputs an in-phase I and quadrature output Q which are fed to respective (0-1280 MHz) lowpass filters F18 and F19 which are coupled to A/D converters 39 and 41 which being locked by frequencies of 1280 MHz. The digital outputs from the A/D converters 39 and 41 are fed to a digital phase converter 28 which provides I and Q outputs to a $\tan^{-1}$ Q/I circuit 29 which feeds into a common random access memory 30" for applying the same phase compensation inputs to DDS#1 and DDS#2. The A/D converters 39 and 41 are clocked by frequencies of 1280 MHz which is at least twice the RF bandwidth which is swept. Also, the 640 MHz DDS clock frequency FS1 and the 1280 MHz A/D clock frequency FS2 are harmonically related to each other and driven from the common master oscillator, not shown; however, an example of such a master oscillator is disclosed in U.S. Pat. No. 6,081,226 entitled "Multi Mode Radar Exciter", which issued to Stephen P. Caldwell et al. on Jun. 27, 2000.

In order to calibrate the TX path, $LO_1$ is held at a fixed frequency as the TX frequency is stepped in small increments through its entire sweep. In each frequency step, the phase error is computed from $\emptyset = \tan^{-1}(Q/I)$, zeroed by DDS predistortion and the digital predistortion phase is stored in the memory 30". In order to calibrate the TX path, the exact same procedure is repeated. After calibration a constant beat note at $IF_1$=2560 MHz, should be recorded in $IF_1$ with a constant $\Delta\emptyset/\Delta\omega$=group delay as both TX and $LO_1$ are swept. In this case, it is easier to excite both the LO up-converter 15 and the TX up-converter 115 with a single DDS so that both DDSs 9 and 99 do not have to be synchronized, but nevertheless synchronization can be checked.

Figure 11:
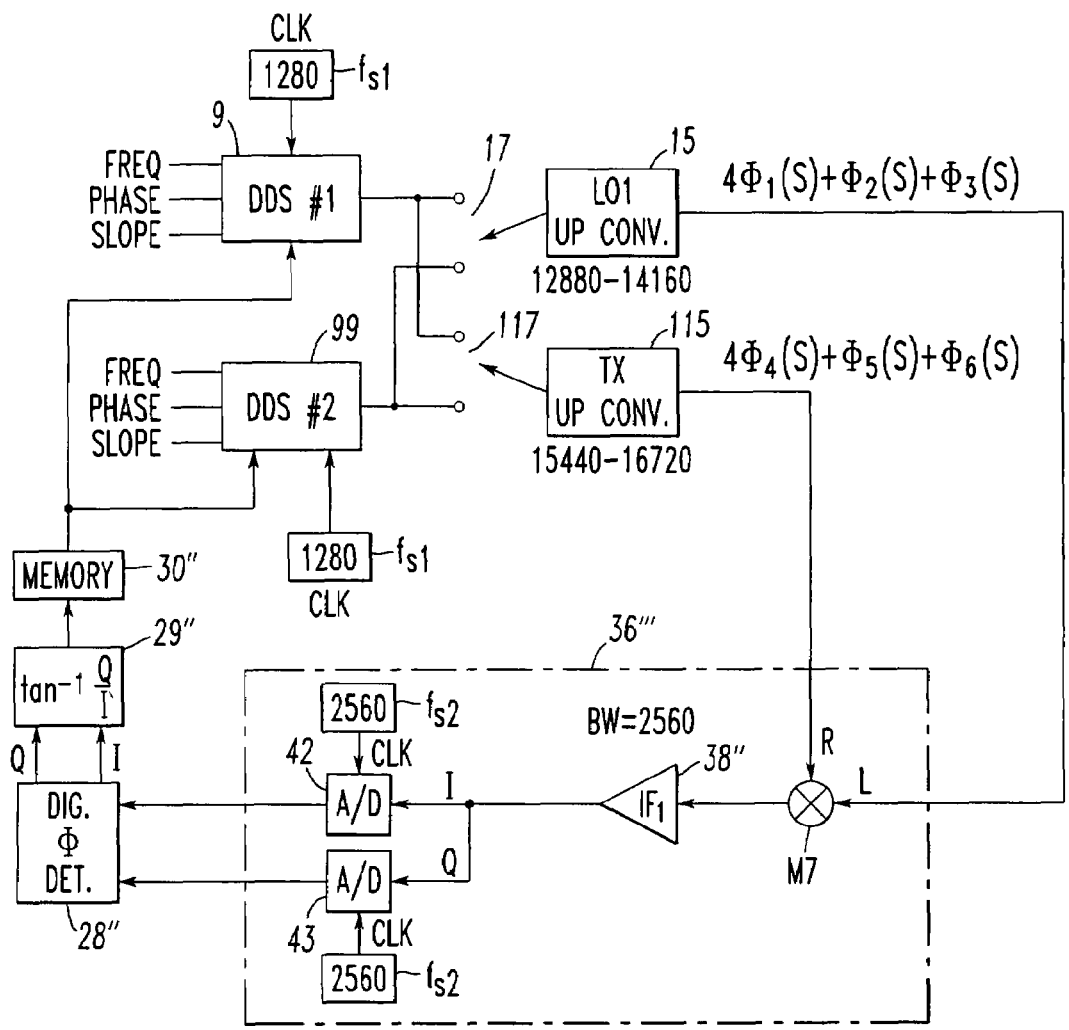
FIG. 11 is illustrative of an embodiment for providing phase compensation with IF sampling over a large bandwidth.

Whereas FIG. 10 depicts a scheme where phase compensation can be achieved with IF sampling over a moderate bandwidth, FIG. 11 discloses a scheme wherein phase compensation with IF sampling is provided over a large bandwidth. In FIG. 11, the TX and $LO_1$ bandwidths have been doubled by virtue of the 1280 MHz clock signal FS1 applied to DDS#1 9 and DDS#2 99. In this configuration, the second mixer M8 (FIG. 10) has been eliminated and a phase error measurement is made with the IQ analog to digital converters 42 and 43 connected directly to the $IF_1$ output of amplifier 38" in the receiver circuitry 36''' having a bandwidth equal to 2560 MHz which is twice the bandwidth of IF amplifier 38' shown in the receiver 36" of FIG. 10.

The following Tables I and II are illustrative of typical values of calibrating the TX and $LO_1$ signal paths. Table I is illustrative of the calibration procedure for the circuitry shown in FIG. 10, whereas Table II is illustration of the calibration procedure for the TX signal in FIG. 11.

TABLE I

| Fixed $LO_1$ | Calibrate TX Sweep TX | $IF_1$ | $IF_2$ |
|---|---|---|---|
| 12880 | 15440-16080 | 2560-3200 | 640-0 |
| 13520 | 15440-16080 | 1920-2560 | 1280-640 |

| Fixed TX | Calibrate $LO_1$ Sweep $LO_1$ | $IF_1$ | $IF_2$ |
|---|---|---|---|
| 15440 | 12880-13520 | 2560-1920 | 640-1280 |
| 16080 | 12880-13520 | 3200-2560 | 0-640 |

TABLE II

| Fixed $LO_1$ | Calibrate TX Sweep TX | $IF_1$ |
|---|---|---|
| 12880 | 15440-16720 | 2560-3870 |
| 14160 | 15440-16720 | 1280-2560 |

Figure 12:
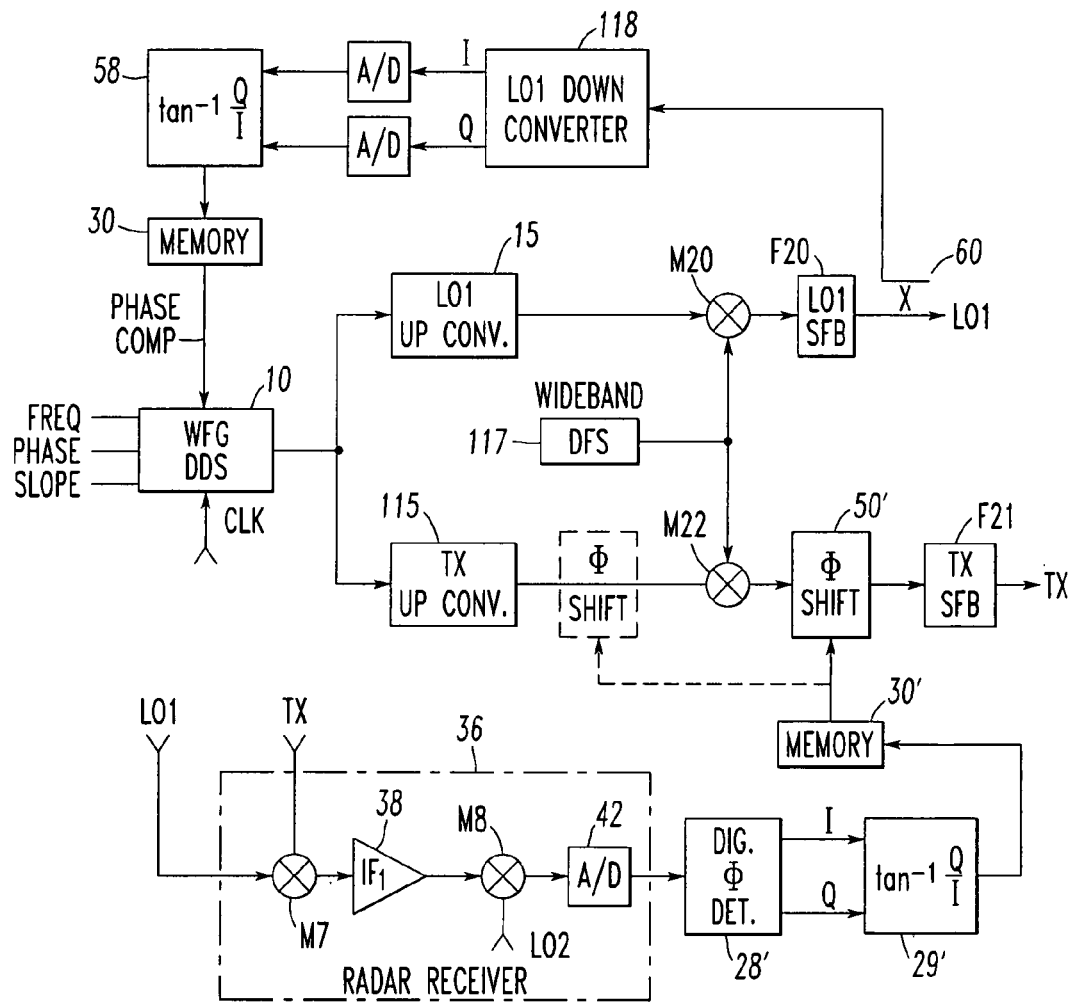
FIG. 12 is illustrative of another embodiment for providing phase compensation of the transmit signal TX and local oscillator signal $LO_1$ employing a different architecture in which the receiver $IF_1$ is not generated directly to generate TX excitation.
Figure 13A:
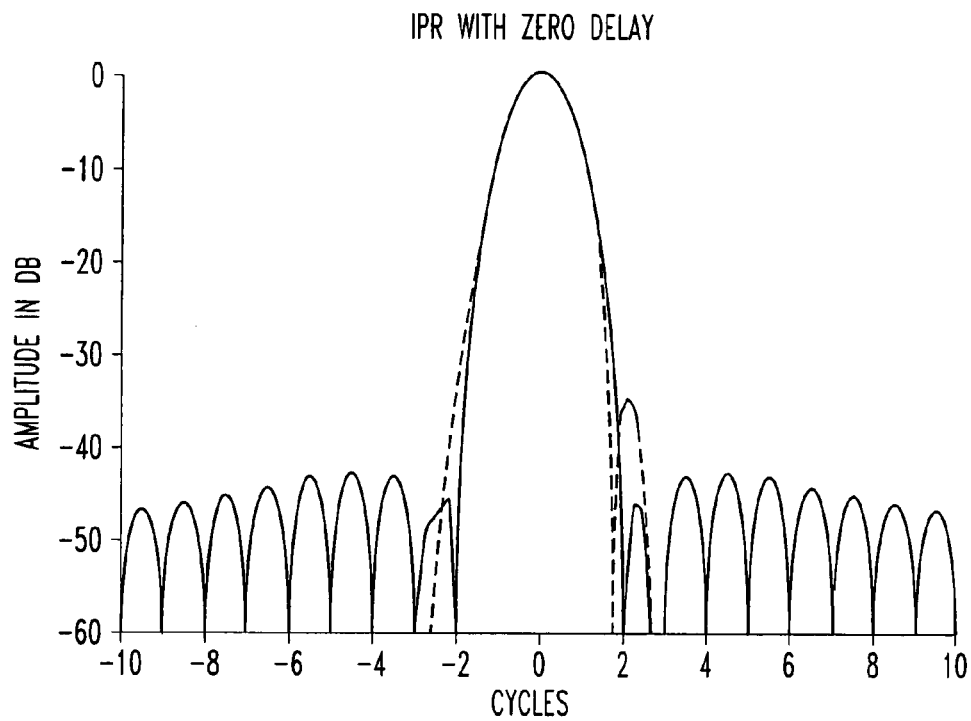
FIGS. 13A and 13B are illustrative of a pair of characteristic curves illustrative of the impulse response for transmit with zero delay for 5° and 1 cycle ripple.
Figure 13B:
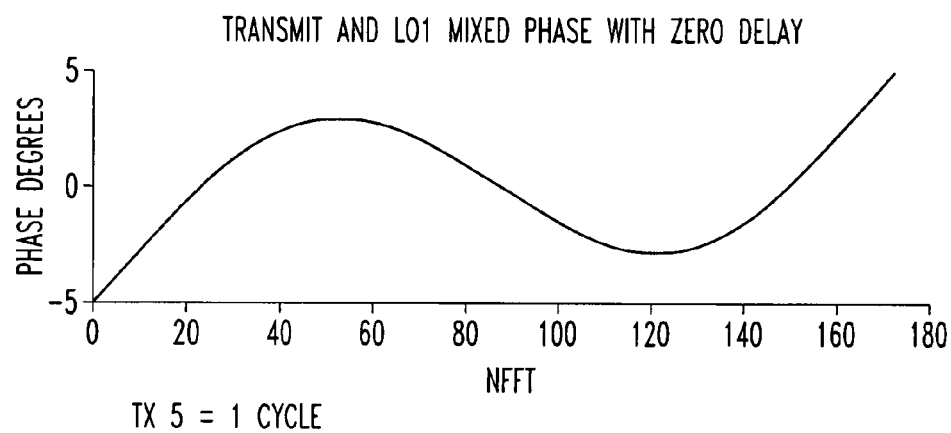
Figure 14A:
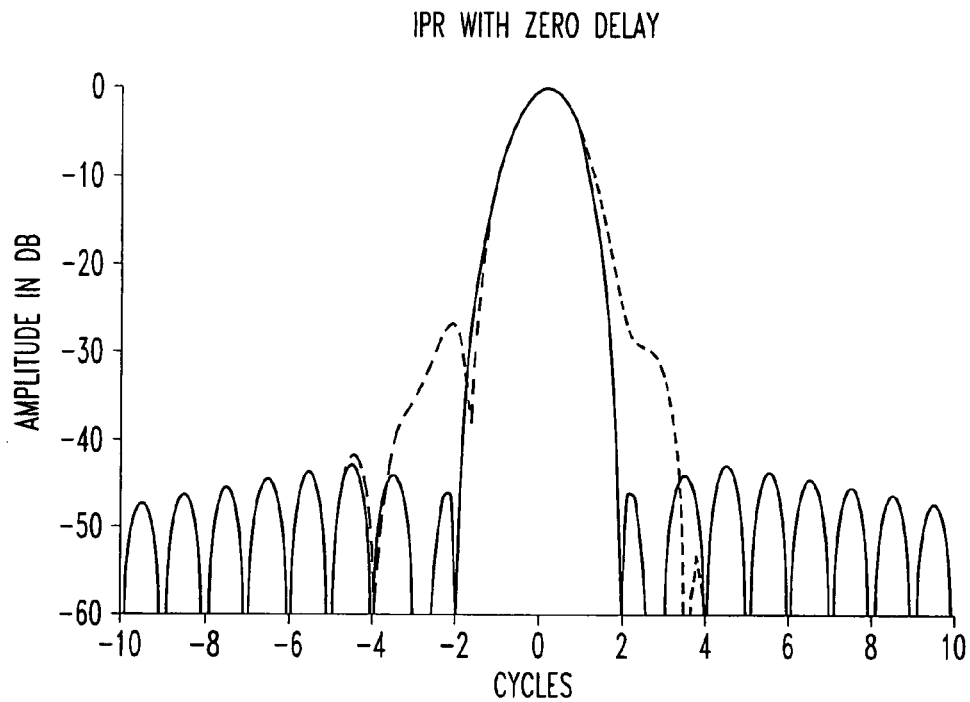
FIGS. 14A and 14B are illustrative of characteristic curves of the impulse response for transmit with zero delay for 5° and two cycle ripple.
Figure 14B:
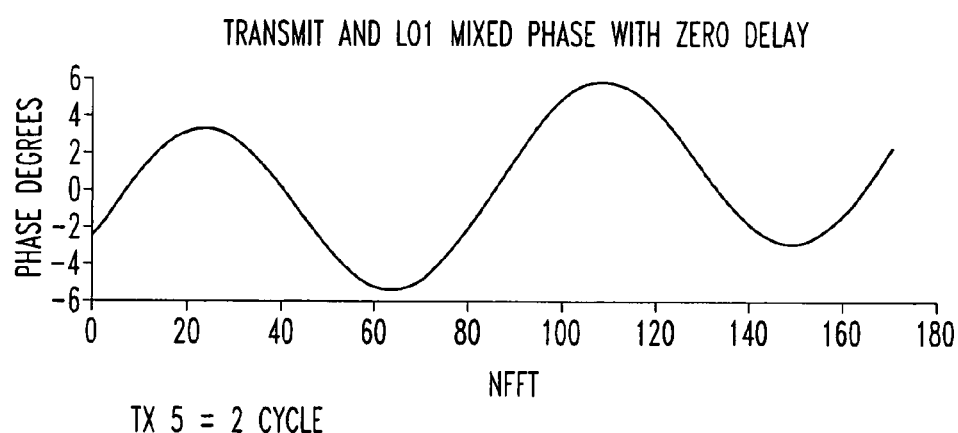
Figure 15A:
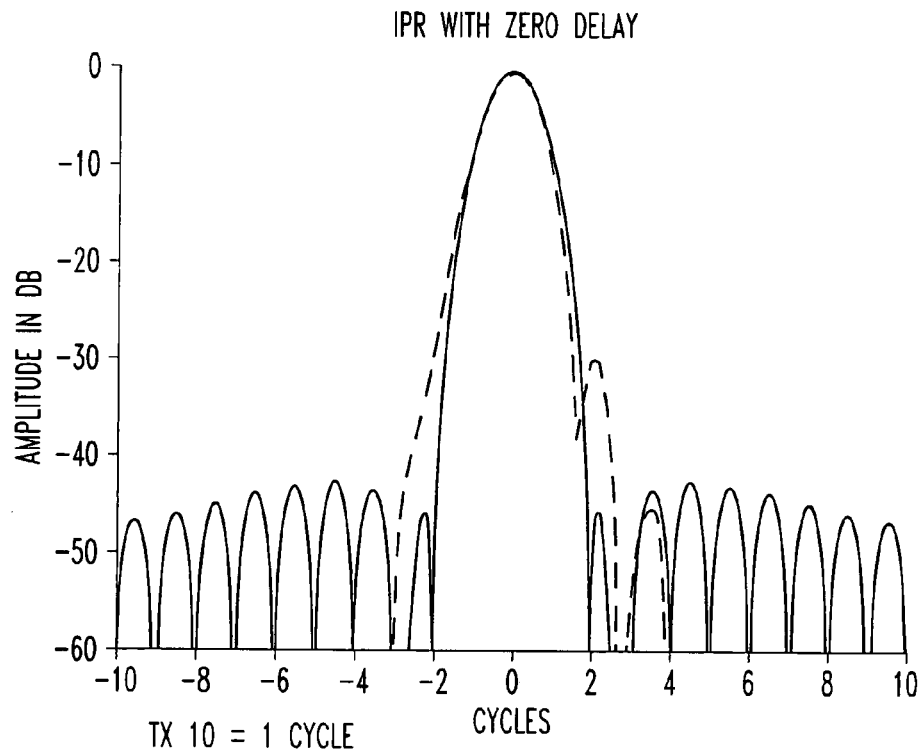
FIGS. 15A and 15B are illustrative of characteristic curves illustrative of the impulse response for transmit with zero delay for 10° and 1 cycle ripple.
Figure 15B:
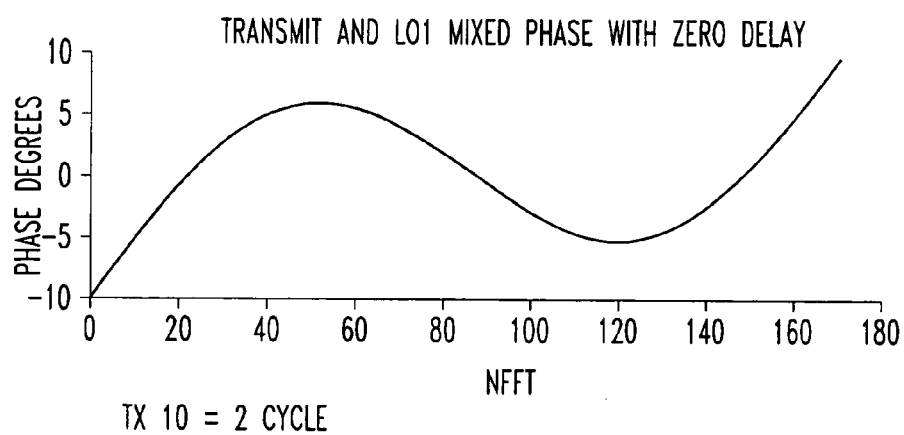
Figure 16A:
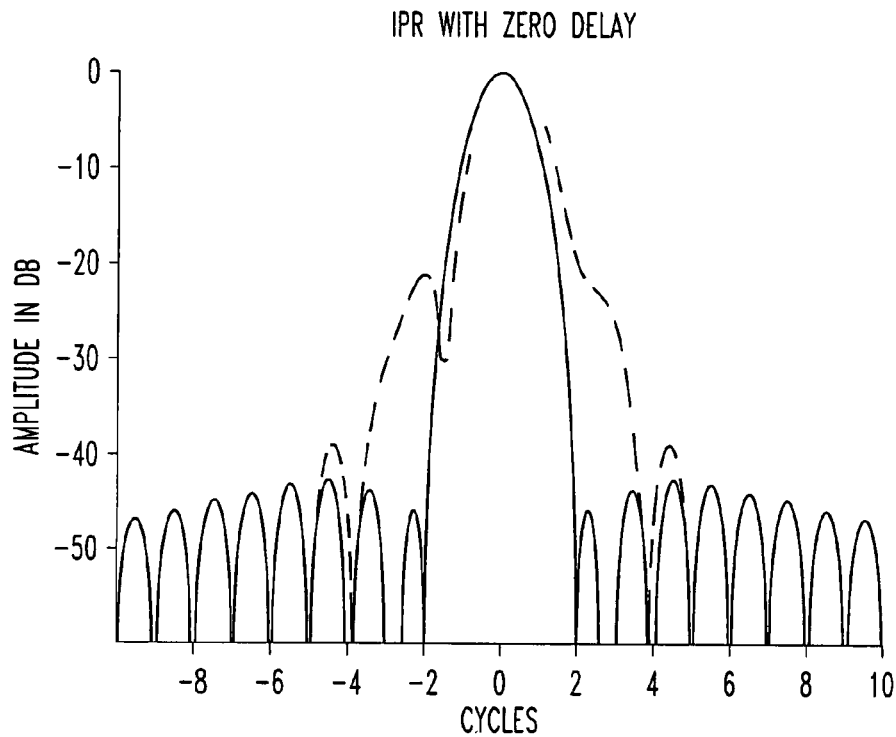
FIGS. 16A and 16B are characteristic curves illustrative of impulse response for transmit with zero delay for 10° and 2 cycle ripple.
Figure 16B:
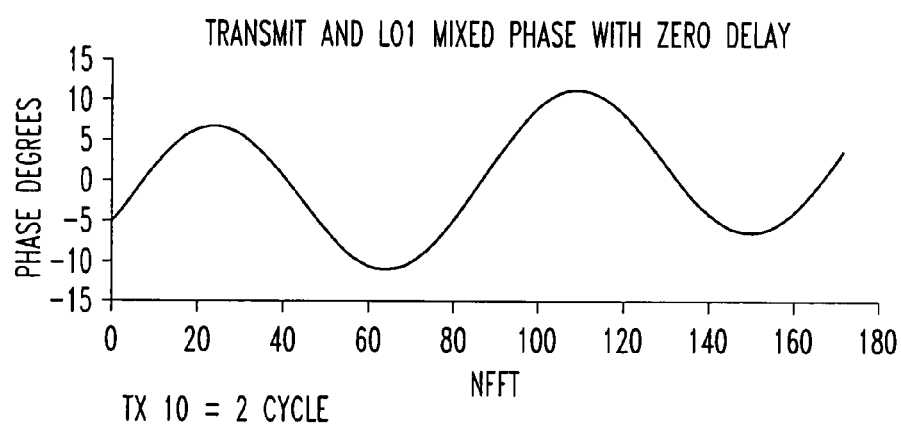

Referring now to FIG. 12, shown thereat is a common STALO architecture which uses a single DDS waveform generator 10 to drive both the $LO_1$ up-converter 15 and the TX up-converter 115. Both up-converters 15 and 115 are mixed with a common signal from a wideband frequency synthesizer (DFS) 117 in mixers M20 and M22 which are coupled to $LO_1$ and TX switched filter banks F20 and F21. The $LO_1$ up-converter 15 and the TX up-converter 115 outputs differ in frequency by a value of the receiver $IF_1$ frequency. FIG. 12 also shows a $LO_1$ down-converter identified by reference numeral 118. This down-converter includes the elements shown in FIG. 6 from mixer M4 to the digital phase detector 28.

With a configuration such as shown in FIG. 12, the WFG 10 and $LO_1$ path must first be calibrated by predistorting the DDS, not shown, in the WFG 10 by using a technique shown in FIG. 6. In this instance, digital predistortion commands are stored for each filter in the switched filter bank F20. Once $LO_1$ is phase calibrated, the radar receiver can be used to phase calibrate the transmit path using the radar receiver and using a phase shifter 50' located in front of the TX switched bank filter F21 or placed after the TX up-converter 115 as shown in FIG. 2.

In all three STALO/WFG configurations shown in FIGS. 1, 9, and 10, additional DDS based functions have not been depicted in order to avoid unnecessary complexity. All three configurations may require another DDS to provide narrow band FM on both TX and $LO_1$ for radar FM ranging and a clutter track DDS on TX. In order to achieve phase calibration using IF sampling, both the clutter track DDS and the narrow band FM DDS must be held constant in frequency and phase. Also, both DDSs must have clocks which are derived from a master oscillator and which are harmonically related to the master oscillator. Hence, the clocks for the WFG DDS and the clutter DDS, for the NBFM DDS and for the I/Q A/D converters, must all be harmonically related and phase locked.

With respect to the characteristic curves shown in FIGS. 13-16, they depict an impulse response (IPR) for transmit TX with zero delay. Each figure also shows a perfect IPR in which there is no amplitude of phase distortion in the transmit path. For example, FIG. 13A depicts the IPR with zero delay for 5° of one cycle ripple as shown in FIG. 13B, whereas FIGS. 14A and 14B show IPR with zero delay and two cycle ripple. FIGS. 15A and 15B, respectively, depict IPR with zero delay for 10° of one cycle ripple, while FIGS. 16A and 16B disclose IPR with zero delay for 10° two cycle ripple.

The foregoing description and drawing figures related thereto disclose how phase non-linearities in a DDS based waveform generator can be compensated for by phase predistorting the DDS. As a result, much better time sidelobes can be achieved in the IPR response. As a consequence, simple wideband lowpass filters can be employed. Such circuits, moreover, are highly phase linear and do not introduce significant phase errors in the calibration procedure and can be made to operate in low spurious regions of a mixer.

Having thus described what is considered to be the preferred embodiments of the invention, it will be obvious that the same may be varied in many ways. For example, the subject invention is not meant to be limited to the use of DDS based waveform generators. Also, the concepts disclosed in the present invention are applicable to many other applications, but not limited to, communications systems, broad band spread spectrum systems, test instruments, and other applications which require the generation and use of highly linear FM signals. Accordingly, such variations are not to be regarded as a departure from the spirit and scope of the invention, since all such modifications as would be obvious to one skilled in the art are intended to be included within the scope of the following claims.

The invention claimed is:

1. A method of compensating for phase error introduced in the generation and translation of signals of an electrical system, comprising the steps of:
    generating one or more waveform generator signals;
    generating at least one local oscillator signal from said waveform generator signals;
    generating and translating at least one electrical output signal utilizing said local oscillator signal;
    detecting all of the phase errors introduced by circuitry used in generating said local oscillator signal and in generating and translating said output signal;
    generating a set of phase predistortion values of phase which are in phase opposition to the detected phase errors; and
    applying selected phase predistortion values from said set of said predistortion values to the circuitry used in generating said waveform generator signals, said local oscillator signal, and said circuitry used in generating and translating said output signal so as to provide phase compensation for the signals generated thereby.

2. The method of claim 1 and additionally including the steps of storing the detected phase errors for subsequent use on demand, and
    generating said predistortion values from the stored detected phase errors.

3. The method of claim 1 wherein said step of generating said one or more waveform generator signals includes driving said signals from a wide band waveform signal generator.

4. The method of claim 3 wherein said step of storing includes digitizing the detected phase errors and storing the digitized phase errors in at least one digital signal memory.

5. A method of compensating for the phase errors introduced in the generation and transmission of RF signals, comprising the steps of:
    detecting the values of the phase errors introduced in the generation of a local oscillator signal and RF output signal at discrete increments of frequency over a predetermined frequency range;
    digitizing and storing the phase errors of the local oscillator signal and the phase error values of the RF signal;
    generating phase predistortion command values from said stored phase errors for use in subsequent generation of said local oscillator and said RF output signal;
    generating a signal by a waveform generator;
    selectively calling up predetermined stored phase predistortion command values for said signal;
    applying one or more predetermined phase predistortion command values to said signal and thereby generating a phase compensated signal;
    generating a phase compensated local oscillator signal and a phase compensated RF output signal utilizing said phase compensated signal, wherein said signals are generated by circuitry including a waveform signal generator, a local oscillator signal generator, an RF signal generator one or more signal filters in a first signal path between the waveform signal generator and the local oscillator signal generator and the RF signal generator, and one or more signal filters in a second signal path between the local oscillator signal generator and said at least one phase detector wherein the one or more signal filters in the first signal path comprise one or more bandpass filters and wherein the one or more signal filters in the second signal path comprise one or more low pass filters.

6. The method of claim 5 and additionally including the step of generating and applying frequency and phase commands when generating the signal by the waveform generator.

7. The method of claim 6 and additionally including the step of applying said one or more phase predistortion command values to said signal substantially concurrently with the application of the frequency and phase commands.

8. Apparatus for compensating for phase error introduced in the generation and transmission of RF output signals of an electrical signal system, comprising:
    circuitry for generating one or more signals utilized in the generation of output signals, wherein said circuitry for generating one or more signals includes a waveform signal generator, a local oscillator signal generator, an RF signal generator, one or more signal filters in a first signal path between the waveform signal generator and the local oscillator signal generator and the RF signal generator, and one or more signal filters in a second signal path between the local oscillator signal generator and said at least one phase detector, wherein the one or more signal filters in the first signal path comprises one or more bandpass filters and wherein the one or more signal filters in the second signal path comprises one or more low pass filters;
    at least one phase detector for detecting the phase errors introduced by the circuitry used in the generation of said one or more signals over a predetermined frequency range;
    at least one memory for storing a predetermined number of phase predistortion values generated in response to the detected phase errors and which are in phase opposition thereto;
    one or more circuit components connected to said at least one memory for downloading and applying predetermined phase predistortion values of the stored predistortion values to said circuitry for generating said one or more signals utilized so as to generate phase compensated signals utilized in the generation of said radar output signals.

9. The apparatus of claim 8 wherein said first signal path includes frequency up-converter circuitry and the second signal path includes frequency down-converter circuitry.

10. Apparatus compensating for the phase errors introduced in the generation and transmission of RF signals in a radar system comprising:
    at least one phase detector circuit for detecting signals having values of the phase errors introduced in the generation of a local oscillator signal and a transmit RF output signal at discrete increments of frequency over a predetermined frequency range, wherein said phase detector circuit includes a first phase detector for detecting the phase errors introduced in the generation of the local oscillator signal and a second phase detector for detecting the phase errors introduced in the generation and transmission of the transmit RF output signal;
    an analog to digital converter circuit for digitizing the detected phase error signals;

at least one digital memory responsive to the digitized phase error signals of the local oscillator signal and the RF output signal for generating and storing phase distortion command values having phase values opposite the phase error signals for use in subsequent generation of said local oscillator and said transmit RF output signal;

at least one waveform signal generator for generating at least one waveform signal;

a local oscillator signal generator responsive to said at least one waveform signal to generate said local oscillator signal;

an RF signal generator responsive to said local oscillator signal and for generating said RF output signal; and circuitry for selectively calling up predetermined stored phase predistortion command values from said at least one digital memory, applying one or more predetermined phase predistortion command values and substantially concurrently applying frequency and phase commands to the waveform signal during generation thereof by said waveform generator and thereby generating a phase compensated waveform signal used to generate a phase compensated local oscillator signal, and applying one or more phase predistortion command values to the transmit RF output signal so as to generate a phase compensated transmit RF output signal.

11. The apparatus of claim 10 wherein said at least one digital memory comprises a first digital memory responsive to the digitized phase error signals of the local oscillator signal and a second digital memory responsive to the digitized phase error signals of the RF output signal.

12. The apparatus of claim 10 and additionally including a phase shifter for applying phase predistortion command values to the transmit RF output signal.

13. The apparatus of claim 12 wherein the waveform signal generator, the local oscillator signal generator and the RF signal generator are connected in a series circuit configuration including a frequency up-converter connected between the waveform signal generator and the local oscillator signal generator and a frequency down-converter connected between the local oscillator signal generator and the first phase detector.

14. The apparatus of claim 13 and additionally including at least one signal filter connected in series with the frequency up-converter.

15. The apparatus of claim 14 wherein said at least one signal filter comprises a first and a second signal filter located on each side of the frequency up-converter and a third signal filter in the local oscillator signal generator.

16. The apparatus of claim 15 wherein said first, second and third signal filter are comprised of bandpass filters.

17. The apparatus of claim 16 and additionally including at least one other signal filter connected in series with the frequency down-converter.

18. The apparatus of claim 17 wherein said at least one other signal comprises a fourth and fifth signal located on each side of the frequency down-converter.

19. The apparatus of claim 18 wherein said fourth and fifth signal filter are comprised of low pass filters.

* * * * *